United States Patent
Adler et al.

(10) Patent No.: US 8,744,417 B2
(45) Date of Patent: *Jun. 3, 2014

(54) METHOD OF INHIBITING FUNCTIONS OF A MOBILE COMMUNICATIONS DEVICE

(71) Applicant: Websafety, Inc., Newport Beach, CA (US)

(72) Inventors: Michael Adler, Dallas, TX (US); Russell Spiesser, Ashmore (AU)

(73) Assignee: WebSafety, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,141

(22) Filed: Feb. 1, 2013

(65) Prior Publication Data

US 2013/0210413 A1 Aug. 15, 2013

Related U.S. Application Data

(63) Continuation of application No. 12/506,045, filed on Jul. 20, 2009, now Pat. No. 8,380,176.

(60) Provisional application No. 61/087,506, filed on Aug. 8, 2008.

(51) Int. Cl.
*H04M 3/42* (2006.01)

(52) U.S. Cl.
USPC ............... 455/414.1; 455/456.1; 455/466; 370/328; 370/338

(58) Field of Classification Search
USPC ............ 455/456.1–456.6, 414.1, 466, 403, 455/422.1, 565, 567, 569.1, 569.2; 370/328–338
See application file for complete search history.

(56) References Cited

U.S. PATENT DOCUMENTS

| | | | |
|---|---|---|---|
| 6,353,778 B1 | 3/2002 | Brown | |
| 7,231,218 B2 | 6/2007 | Diacakis et al. | |
| 7,280,816 B2 | 10/2007 | Fratti et al. | |
| 7,302,272 B2 | 11/2007 | Ackley | |
| 7,397,365 B2 | 7/2008 | Wang | |
| 7,643,834 B2 | 1/2010 | Ioppe et al. | |
| 7,801,512 B1 | 9/2010 | Myr | |
| 8,005,913 B1 | 8/2011 | Carlander | |
| 8,027,662 B1 | 9/2011 | Miller et al. | |
| 8,107,670 B2 | 1/2012 | Songhurst | |
| 8,116,726 B2 | 2/2012 | Richardson et al. | |
| 8,204,494 B2 | 6/2012 | Weinzier | |
| 8,229,669 B2 | 7/2012 | Roumeliotis et al. | |

(Continued)

OTHER PUBLICATIONS

Final Office Action for U.S. Appl. No. 12/040,581; published as U.S. Appl. No. 2009-0215466; 13 pgs.

*Primary Examiner* — Chuong A Ngo
(74) *Attorney, Agent, or Firm* — Knobbe Martens Olson & Bear LLP

(57) ABSTRACT

A method of inhibiting a function of a multi-function portable personal communications device includes determining a first position of the personal communications device, after a predetermined time interval, determining a second position of the personal communications device, determining the distance between the first position and the second position, determining the time interval in which the personal communications device moved from the first position and the second position, calculating an average velocity of the personal communications device based on the first position, the second position and the time interval and, if the average velocity of the personal communication device exceeds a predetermined value, inhibiting a function of the personal communications device.

20 Claims, 11 Drawing Sheets

(56) References Cited

U.S. PATENT DOCUMENTS

| | | |
|---|---|---|
| 8,248,223 B2 | 8/2012 | Periwal |
| 8,265,618 B2 | 9/2012 | MacNaughtan et al. |
| 8,280,438 B2 | 10/2012 | Barbera |
| 8,307,029 B2 | 11/2012 | Davis et al. |
| 8,355,737 B2 | 1/2013 | MacNaughtan et al. |
| 8,358,846 B2 | 1/2013 | Gibbs |
| 8,359,044 B2 | 1/2013 | MacNaughtan et al. |
| 8,380,176 B2 | 2/2013 | Adler et al. |
| 8,437,771 B1 | 5/2013 | Coverstone |
| 8,538,458 B2 | 9/2013 | Haney |
| 8,548,244 B2 | 10/2013 | Conradt et al. |
| 8,583,112 B2 | 11/2013 | Booth et al. |
| 2003/0033582 A1 | 2/2003 | Klein et al. |
| 2005/0043036 A1 | 2/2005 | Ioppe et al. |
| 2005/0043037 A1 | 2/2005 | Ioppe et al. |
| 2006/0099940 A1 | 5/2006 | Pfleging et al. |
| 2007/0026850 A1 | 2/2007 | Keohane et al. |
| 2007/0072553 A1 | 3/2007 | Barbera |
| 2008/0300967 A1 | 12/2008 | Buckley et al. |
| 2009/0002147 A1* | 1/2009 | Bloebaum et al. ............ 340/466 |
| 2009/0011779 A1 | 1/2009 | MacNaughtan et al. |
| 2009/0047973 A1 | 2/2009 | MacNaughtan et al. |
| 2009/0075651 A1 | 3/2009 | MacNaughtan et al. |
| 2009/0131038 A1 | 5/2009 | MacNaughtan et al. |
| 2009/0135730 A1 | 5/2009 | Scott et al. |
| 2009/0171577 A1 | 7/2009 | Roumeliotis et al. |
| 2009/0215387 A1 | 8/2009 | Brennan et al. |
| 2009/0215465 A1 | 8/2009 | MacNaughtan et al. |
| 2009/0215466 A1 | 8/2009 | Ahl et al. |
| 2009/0275281 A1 | 11/2009 | Rosen |
| 2009/0298505 A1 | 12/2009 | Drane et al. |
| 2010/0087194 A1 | 4/2010 | MacNaughton et al. |
| 2010/0248640 A1 | 9/2010 | MacNaughton et al. |
| 2010/0291907 A1 | 11/2010 | MacNaughtan et al. |
| 2011/0034179 A1 | 2/2011 | David et al. |
| 2011/0045811 A1 | 2/2011 | Kemery |
| 2011/0219080 A1 | 9/2011 | McWithey et al. |
| 2011/0227730 A1 | 9/2011 | Stevenson et al. |
| 2012/0094696 A1 | 4/2012 | Ahn et al. |
| 2012/0135705 A1 | 5/2012 | Thaker |
| 2013/0013705 A1 | 1/2013 | White et al. |
| 2013/0157655 A1 | 6/2013 | Smith, II et al. |
| 2013/0178151 A1 | 7/2013 | Itzhaki |
| 2013/0283388 A1 | 10/2013 | Ashok et al. |
| 2013/0283401 A1 | 10/2013 | Pabla et al. |

\* cited by examiner

METHOD OF INHIBITING FUNCTIONS OF A MOBILE COMMUNICATIONS DEVICE

CROSS-REFERENCE TO RELATED APPLICATIONS

This application is a continuation of U.S. patent application Ser. No. 12/506,045, filed Jul. 20, 2009, entitled METHOD OF INHIBITING FUNCTIONS OF A MOBILE COMMUNICATIONS DEVICE, now U.S. Pat. No. 8,380,176, issued Feb. 19, 2013 which claims benefit of U.S. Provisional Application No. 61/087,506, filed Aug. 8, 2008, entitled METHOD OF INHIBITING FUNCTIONS OF A MOBILE COMMUNICATIONS DEVICE, the specifications of which are incorporated herein in their entirety.

TECHNICAL FIELD

The following disclosure relates to inhibiting one or more functions of a multi-function portable personal communications device, and in particular to inhibiting one or more functions of a cellular telephone handset when the handset is moved at an average velocity greater than a predetermined value.

BACKGROUND

In the United States, automobile accidents are the leading cause of death for teenagers. For example, in 2005, 4,544 teenagers between the ages of 16 to 19 died of injuries caused by motor vehicle crashes. In the same year, nearly 400,000 motor vehicle occupants in this age group sustained nonfatal injuries that required treatment in an emergency department.

A number of risk factors are associated with teenage drivers. Teenage drivers are less experienced and less likely to recognize and appreciate hazardous conditions and are more likely to exceed speed limits. Teenage drivers are also more likely to become distracted while driving. One major cause of distraction is cellular telephone use and, in particular, text messaging while driving.

Text messaging has become a favorite mode of communication between teenagers. However, text messaging while driving a vehicle presents a hazard to the vehicle operator, passengers and other drivers. With the development of Multimedia Messaging Service (MMS) the temptation to use cellular messaging capability while operating a vehicle becomes greater. It has been estimated that up to fifty percent of teenage drivers have formatted, sent and/or read text messages while operating a vehicle.

Several states have, or are considering, prohibiting text messaging while driving. However, enforcing laws prohibiting text messaging may prove problematic since the cellular device may be held in a position where it is not visible to law enforcement personnel. Further, a certain number of teenagers and other drivers may simply ignore the laws, especially if the penalty is nominal. Thus, there exists a need for a method of detecting and inhibiting the use of certain functions of cellular devices such as Short Message Service (SMS), Multimedia Message Service (MMS) and email while the operator of the device is also operating a vehicle.

The use of cellular phones by children and teenagers may be problematic in other situations and in particular in school environments. For example, there have been reports of students using SMS service during class and more seriously, during tests to transmit answers to each other. It has also been reported that SMS service has been used to arrange illegal drug transactions and that child predators have used SMS service in attempts to contact potential victims. Therefore there also exists a need to inhibit the use of various functions of cellular telephones in school and similar environments.

SUMMARY

In one aspect, a method of inhibiting a function of a multi-function portable personal communications device is disclosed. The method includes determining a first position of the personal communications device then, after a predetermined time interval, determining a second position of the personal communications device. The distance between the first and second positions is determined along with the time interval in which the personal communications device moved from the first position to the second position. An average velocity of the personal communications device based on the first position, the second position and the time interval is calculated. If the average velocity of the personal communication device exceeds a predetermined value, one or more functions of the personal communications device may be disabled, blocked or otherwise inhibited.

In one embodiment, the personal communications device may be a cellular telephone handset including a global position receiver for determining the first and second position of the handset. The blocked or inhibited function may be one or more textual message services such as Short Message Service (SMS), Multimedia Messaging Service (MMS), Mobile Instant Messaging Service (MIMS), email and Internet access. In other variations, voice calls to or from the cellular telephone handset may be blocked. In other variations, the cellular telephone handset may be programmed to transmit a message to a remote communications device, the message indicating the average velocity of the portable personal communications device has exceeded the predetermined value.

In another aspect, a method of inhibiting a function of a multi-function portable personal communications device includes determining a first position of the portable personal communications device and after a predetermined time interval determining a second position of the portable personal communications device. The first and second first and second positions of the portable personal communications device are transmitted to a remotely located computer which calculates an average velocity of the multi-function portable personal communications device. The portable communications device may then receive a signal from the remotely located computer, the signal indicating that one or more functions of the personal communications device is to be inhibited. One or more selected functions of the portable personal communications device may then be disabled, blocked or inhibited based on the signal received from the remotely located computer.

In one embodiment, the remotely located computer calculates an average velocity of the multi-function portable personal communications device based on the first and second positions of the multi-function portable personal communications device and the time interval in which the portable personal communications device moved from the first position to the second position. The remotely located computer compares the average velocity to a predetermined value, and if the average velocity is greater than the predetermined value, the remotely located computer transmits a signal instruction the portable communications device to disable, block or inhibit one or more functions of the device. The personal communications device may be a cellular telephone handset including a global position receiver for determining the first and second position of the handset and the inhibited function(s) may be a non-voice function such as a textual message service or a multimedia message service.

In another aspect, a method of monitoring a multi-function portable personal communications device including a GPS receiver includes receiving signals to determine the location of the multi-function portable personal communications device at predetermined intervals. The location of the multi-function portable personal communications device is compared to one or more predetermined locations and the distance between the predetermined location and the device is determined. The distance between the multi-function portable personal communications device and the predetermined location is compared to a predetermined distance value. If the distance between the multi-function portable personal communications device and the predetermined location is less than the predetermined distance value a pre-programmed instruction to inhibit a function of the portable personal communications device is implemented. In one variation, the method includes comparing the current date and time to a preprogrammed or predetermined date and time interval and implementing a pre-programmed instruction to inhibit or enable a previously blocked function of the portable personal communications device if the current time is within the predetermined time interval.

In yet another embodiment, a method of controlling a function of a multi-function portable personal communications device including a GPS receiver includes receiving signals at predetermined intervals to determine the location of the multi-function portable personal communications device. The location of the multifunction portable personal communications device is compared to one or more predetermined locations that define a geographical zone to determine whether the device is within the geographical zone. If the multi-function portable personal communications device is within the defined geographical zone a pre-programmed instruction to inhibit a function of the portable personal communications device is implemented.

BRIEF DESCRIPTION OF THE DRAWINGS

For a more complete understanding, reference is now made to the following description taken in conjunction with the accompanying Drawings in which.

DETAILED DESCRIPTION

Figure 1:
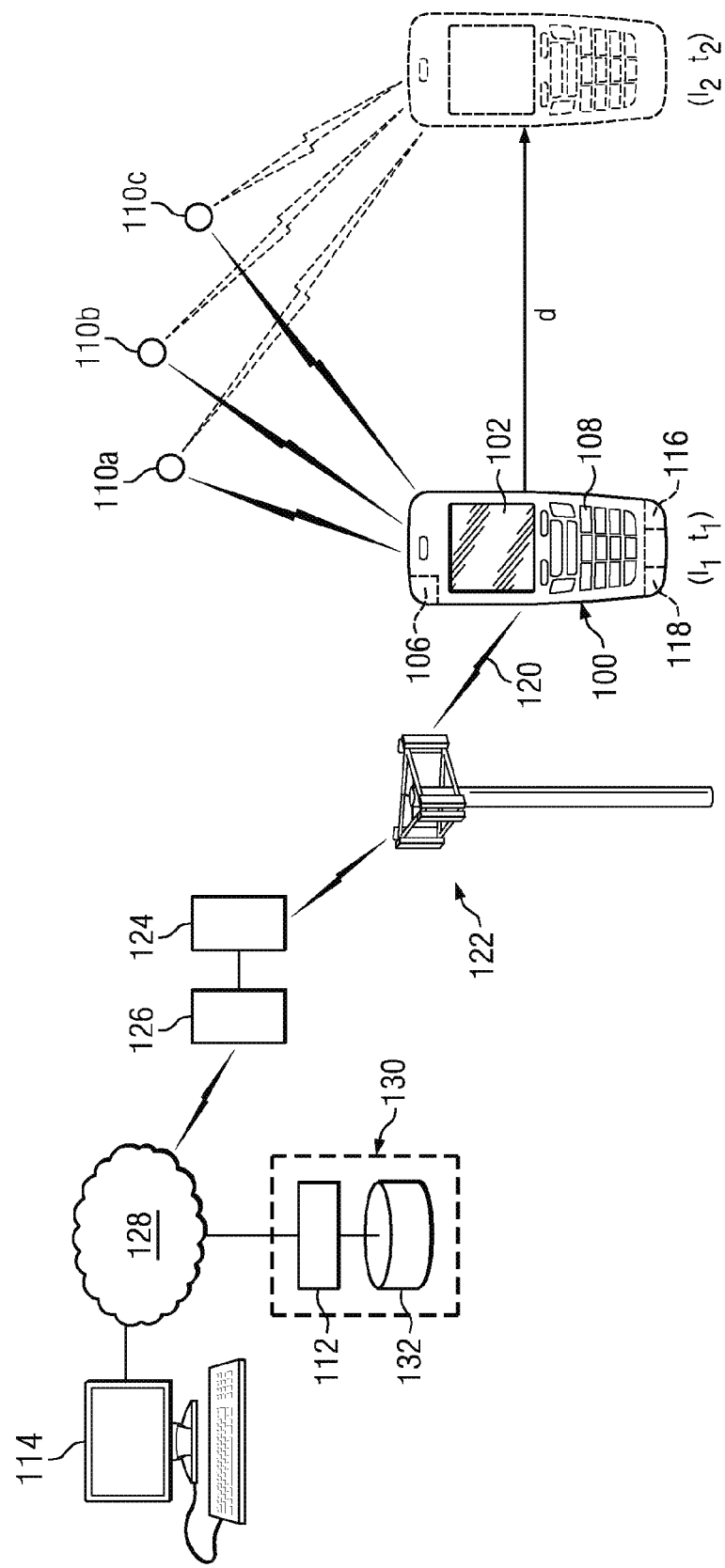
FIG. 1 is a schematic illustrating a cellular communications system wherein methods according to the disclosure may be implemented.

Referring now to the drawings, wherein like reference numbers are used herein to designate like elements throughout, the various views and embodiments are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, a multi-function personal communications device such as a cellular handset 100 includes a display 102 for displaying, among other things, information received in the form of text messages, multi-media messages and email. Handset 100 includes a data entry feature such as a plurality of keys 108, a touch screen and/or a voice recognition feature (not shown). Handset 100 further includes a GPS module 106 for receiving and processing signals from a plurality of global positioning satellites 110a, 110b and 110c. In one embodiment, GPS module 106 is provided with hardware and/or software for calculating the position of the handset based on the signals received from GPS satellites 110. The signals from global positioning satellites 110 provide a means of determining the position of handset 100. Typically, GPS module 106 requires signals from at least three GPS satellites 110A-110C in order to determine the position of handset 100. In other embodiments, GPS module 106 receives signals from four or more GPS satellites in order to determine the position of handset 100. In yet other embodiments, GPS module 106 comprises an Assisted GPS receiver (A-GPS) that communicates with an assistance server.

Handset 100 may also includes a processor 116 with an associated memory 118. Processor 116 may communicate with GPS module 106 to record and store the location of handset 100 in memory 118 at predetermined intervals along with the time(s) the handset is at the location(s). When handset 100 is moved a distance d, processor 116 may receive and store coordinates for locations L2 and L2 from GPS module 106 and store that location along with the times that the handset is at locations L1 and L2. Using preprogrammed logic, processor 116 is thereby able to calculate a relative average velocity for handset 100 as it travels distance d by dividing the distance by the difference between T1 when the handset it at location L1 and T2 when the handset is at location L2. For example, if the time interval, e.g. the difference between T1 and T2 is five minutes and the distance between L1 and L2 is five miles, the calculated average velocity of the handset will be sixty miles per hour. In other variations, GPS module 106 may be preprogrammed to calculate the average velocity of handset 100 as it travels over distance d. In alternate embodiments, handset 100 may be programmed to periodically transmit coordinates to a remote server 112 which may be pre-programmed to calculate the average velocity of the handset and/or to transmit the velocity of the handset to server 112.

Handset 100 transmits and receives voice and data communications via a radio interface 120 with a cellular network 122. A cellular telephone provider 124 and internet service provider 126 link handset 100 to the internet 128 which in turn provides communications with remote user devices 114 and a server 112. Remote user device 114 may be a personal computer, another cellular telephone handset or a similar device. Server 112 may be maintained by a third party service provider 130 and includes a database 132. In one embodiment, database 132 may include maps, preprogrammed instructions for controlling functions of handset 100 along with individual customer records and preferences.

In one embodiment, handset 100 may be preprogrammed to require a password or PIN to change the settings of the handset. For example, handset 100 may be preprogrammed to require that a user enter a password or PIN to enable or disable functions such as voice communications, text messaging, multi-media messaging and email. The password or PIN may be stored in a customer record on database 132 so that server 112 may remotely control functions of handset 100 in response to location or other signals received from the handset. A nominated person, such as a parent or guardian, may use the password or PIN to remotely control functions of handset 100 such as enabling or disabling functions and settings of handset 100 or to change preferences or user information stored on database 132 with a user device 114 such as a personal computer. For example, a nominated person may open an internet connection with a user device 114 and access server 112 via a website. The nominated person may then enter his or her password or PIN to gain access to his or her account, after which the nominated person may instruct server 112 to transmit a message to handset 100 to enable or disable a function or setting of the handset. Database 132 may also include preprogrammed instructions to enable or inhibit functions or settings of handset 100 in response to signals received from handset 100 by server 112.

Figure 2:
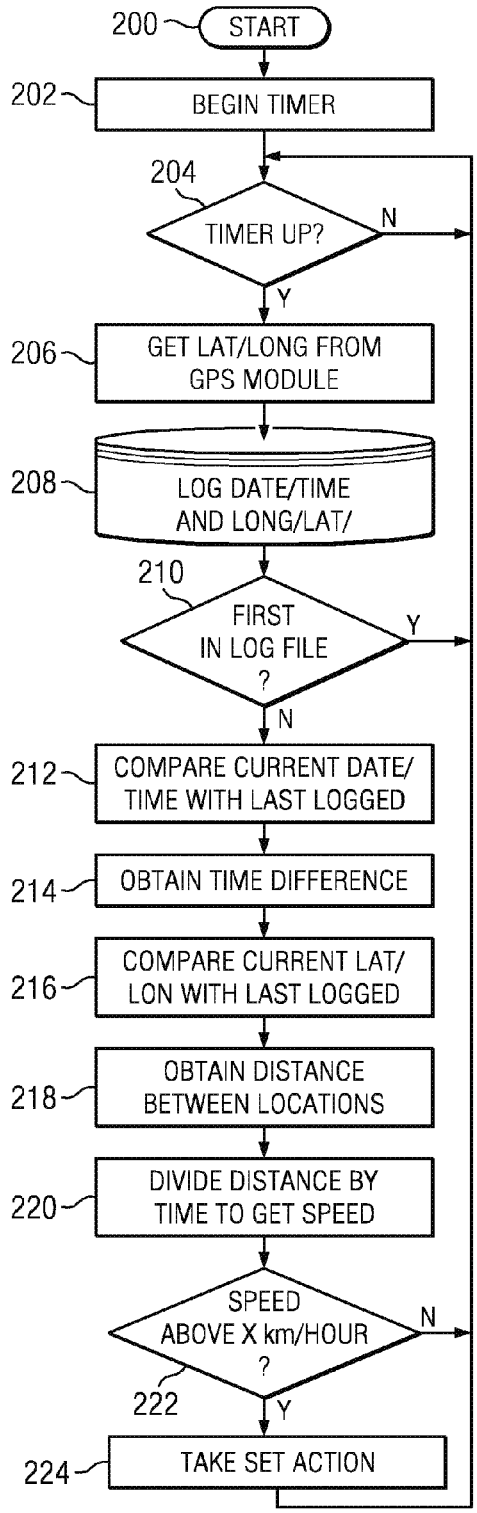
FIG. 2 is a flow chart illustrating a first method according to the disclosure.

FIG. 2 is a flowchart illustrating, in one embodiment, a method according to the disclosure. The process is initiated at step 200 when the user of handset 100 initiates or receives a textual message. The process may also be initiated when the user of handset 100 turns the handset on or selects a textual messaging function. The textual message may be a text message (SMS), a multi-media message (MMS), email, internet connection or other non-voice communication requiring the user of the handset to either enter data via data input device 108 or view a message via display 102. At step 202 a timer or timing function is initialized and started. The timer or timing function may be set for a predetermined time interval such as 1, 3, 5 or 10 minutes. At step 206, the position (latitude, longitude) of handset 100 is obtained using GPS module 106.

In one embodiment, the date and time along with the position of the handset are logged or stored in memory 118 of handset 100 at step 208. At step 210 a check is made to determine whether a previous position and time have been logged. If a prior position and time have not been logged, the process returns to step 204 to determine whether the predetermined time interval has elapsed. If so, a second location of handset 100 is determined at step 206 and the second location and time are logged at step 208. In some instances, for example when handset 100 is in a location such as a tunnel where signals from the global positioning satellites are blocked, GPS module 106 may not be able to determine the coordinates of the handset. In these instances, attempts to determine the location of handset 100 will continue at the predetermined time intervals until two or more successive positions and times have been logged.

After two successive locations and times have been logged, the first and second logged times are compared at step 212 and a time difference or interval is determined at step 214. At step 216 the first and second positions of handset 100 corresponding to the first and second times are compared and the distance between the first and second locations is determined at step 218. The distance that the handset has moved is divided by the time interval in which handset 100 moved from the first position to the second position to determine a relative average velocity for the handset at step 220.

In some embodiments, the GPS module or chip 106 is preprogrammed to perform the speed calculation to determine a relative average velocity at predetermined intervals, for example at one second intervals. In these embodiments, a separate processor and/or memory to perform the velocity calculation may not be required and the process of FIG. 2 goes immediately to step 222 after the relative average velocity is obtained from GPS module or chip 106.

At step 222, the relative average velocity of the handset is compared to a predetermined velocity value, for example 10 or 20 miles per hour, to determine whether the handset may be in a moving vehicle. If the relative average velocity of handset 100 exceeds or has exceeded the predetermined velocity value, a set action is taken at step 224. The predetermined set action may include transmitting a textual message, email or telephone call to a nominated person such as a parent or guardian, and/or disabling or inhibiting one or more of the functions of handset 100. In one embodiment, the nominated person may respond with a message instructing handset 100 to implement a preprogrammed instruction to disable or block one or more functions of the handset. If the set action is inhibiting one or more functions of handset 100, the function may be inhibited for a predetermined time interval, for example 5, 15 or 30 minutes. Alternatively, the function may remain inhibited until a nominated person re-enables the function. Handset 100 may be preprogrammed to require entry of a password or PIN before the inhibited function is re-enabled. The method illustrated in FIG. 2 may be accomplished with preprogrammed logic that may be stored in memory 118 of handset 100 and implemented with processor 116.

Figure 3:
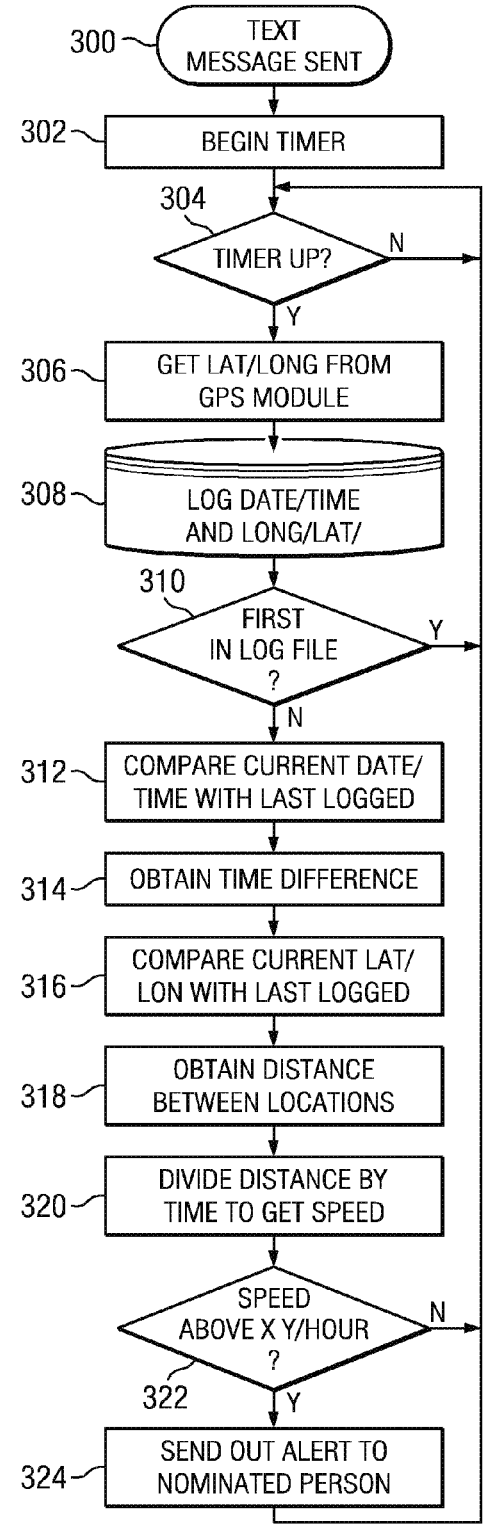
FIG. 3 is a flow chart illustrating a second method according to the disclosure.

Referring now to FIG. 3, in one embodiment, a method according to the disclosure is triggered at step 300 when the user of a portable communications device such as cellular handset 100 initiates a non-voice messaging function such as an SMS or MMS function and/or transmits or receives such a message. At step 302 a timer is initialized and started. The timer may be set for a predetermined period such as 1, 3, 5 or 10 minutes. At step 306 the position of the handset is determined via GPS module 106. The location (latitude, longitude) of handset 100 and the time are logged at step 308. At step 310, the log is checked to determine whether the location and time are the first or a subsequent log entry. If the log entry is not the first entry, at step 312 the time of the entry is compared to the previous time entry. The time difference is determined at step 314. At step 316, the location of handset 100 is compared to the previously logged location of the handset and at step 318 the distance between the two locations is determined. At step 320 the distance is divided by the difference in the logged times to determine a relative average velocity of the handset during the predetermined time interval. For example, if handset 100 has moved five miles in ten minutes, the calculated average velocity will be thirty miles per hour.

The relative average velocity of the handset during the predetermined time interval is compared to a predetermined velocity such as 10 or 20 kilometers or miles per hour at step 322. If the relative average velocity of handset 100 is greater than the predetermined value, at step 324 an alert is transmitted directly to a nominated person such as a parent or guardian. The alert may be transmitted via any format supported by handset 100 such as email, text message, a phone call, MMS or an audio or video call. The alert may be directed to a user device 114 such as a personal computer via cellular network 122 and internet service provider 126 or to another cellular handset via the cellular network. In this embodiment all of the functions and functionalities employed in the method may be programmed and/or hard wired into handset 100.

Figure 4:
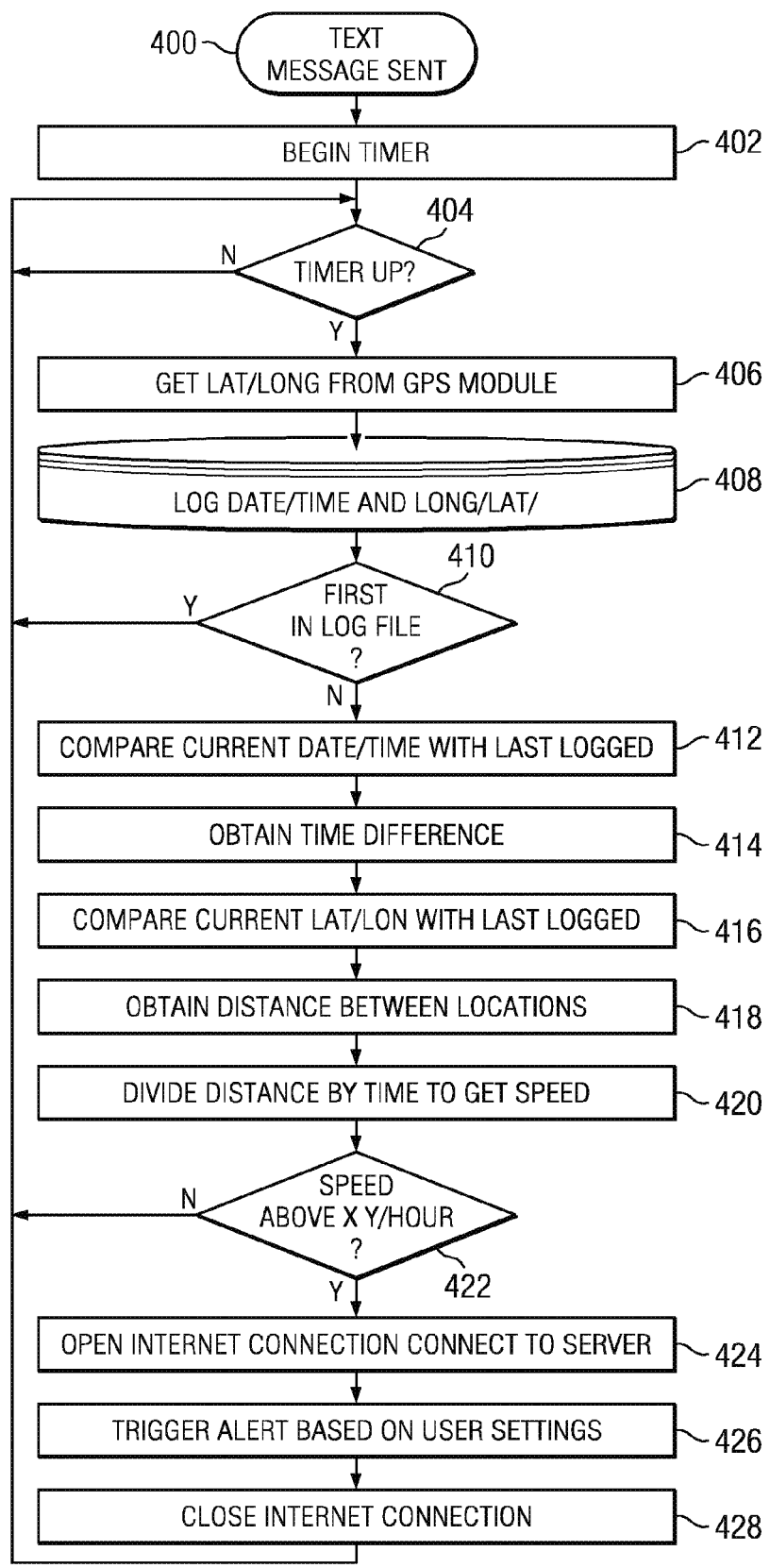
FIG. 4 is a flow chart illustrating a third method according to the disclosure.

Referring now to FIG. 4, in one method according to the disclosure when the user of a personal communications device such as handset 100 initiates a non-voice messaging function such as email, SMS or MMS or transmits such a message, the attempt or transmission is detected at step 400. Steps 402 through 422 are generally the same as steps 200 through 222 described above in connection with FIG. 2. In this variation, if the relative average velocity of handset 100 is greater than the predetermined value, at step 424 handset 100 opens an internet connection with server 112 (FIG. 1) via the cellular network 112 and/or internet service provider 126.

Referring still to FIG. 4, at step 426, server 112 transmits an alert message to a user device 114 based on user settings that may be determined by a nominated person and stored on database 132 (FIG. 1). For example, the nominated person may have chosen 10 or 15 miles per hour as a threshold velocity to trigger an alert. The user device may be a personal computer, a cellular phone or another communications device. The purpose of the alert message is to inform a nominated person such as a parent or guardian that a user of handset 100 is using, attempting to use, or receiving non-voice communications such as SMS or MMS while moving at a velocity indicating that the handset is in a moving vehicle. The nominated person receiving the alert may then take appropriate action such as contacting the user of handset 100. In one embodiment, the nominated person may respond with a message instructing server 112 to transmit a message to handset 100 to implement a preprogrammed instruction to disable or block one or more functions of the handset. Alternatively, the nominated person may transmit a message directly to handset 100 instructing the handset to implement a preprogrammed instruction to disable or block one or more functions of the handset. In this variation, handset 100 is pre-programmed to calculate the average velocity and transmit the velocity to server 112. Server 112 may be configured solely to transmit the message(s) to and from the nominated person.

Figure 5:
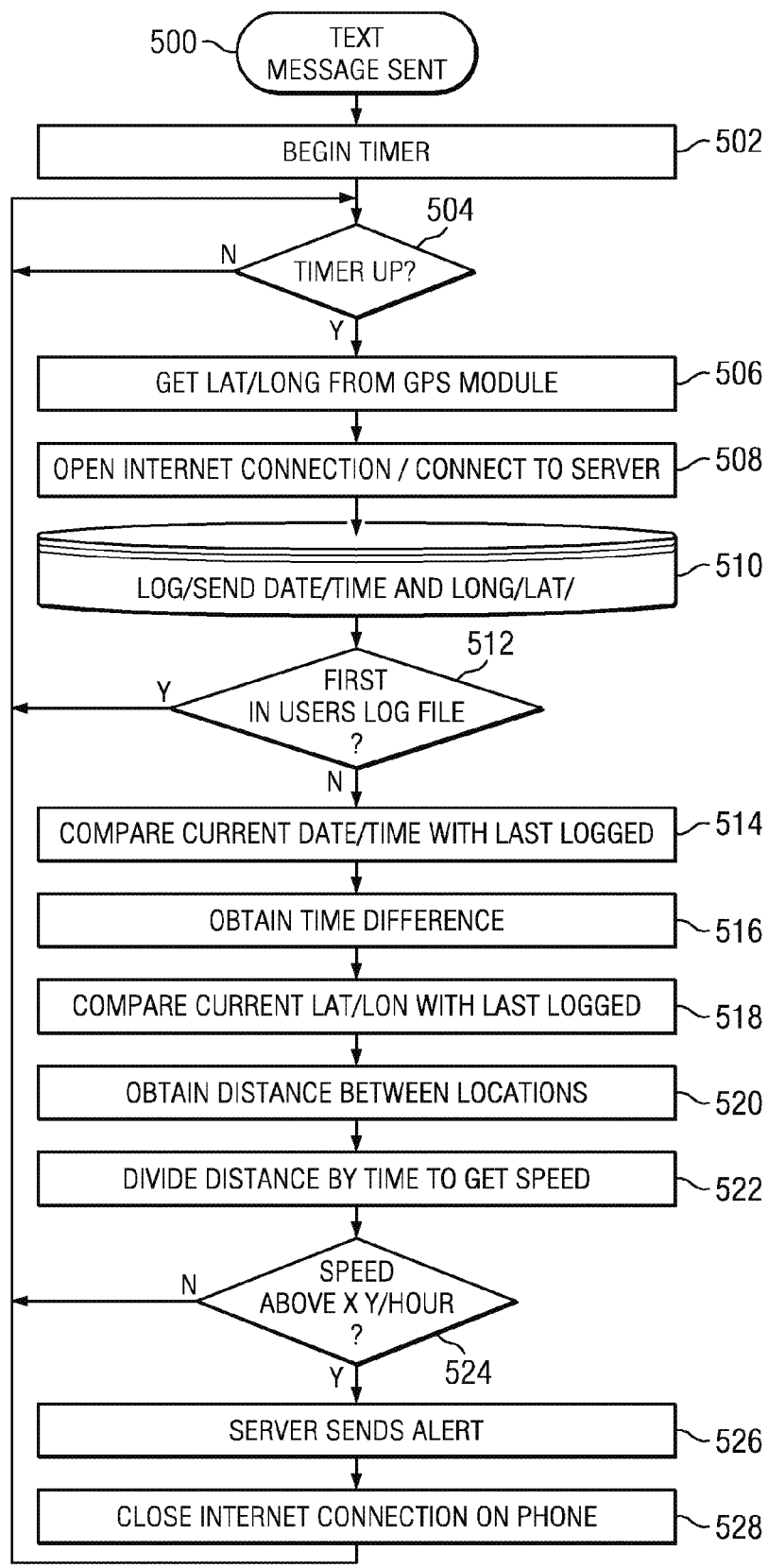
FIG. 5 is a flow chart illustrating a fourth method according to the disclosure.

FIG. 5 is a flowchart illustrating another embodiment of a method according to the disclosure. In accordance with this embodiment, the method is initiated at step 500 when the user of handset 100 invokes a non-voice messaging function or attempts to transmit a non-voice communication such as email or an SMS or MMS message. The method may also be initiated at step 500 when the user of handset 100 receives and/or attempts to view a non-voice message such as an SMS or MMS message. At step 502 a timer or timing function is initialized and started. The location of handset 100 is determined at step 506 and an internet connection is established with server 112 at step 508. Handset 100 transmits the coordinates of handset 100 to server 112. Handset 100 may also transmit the time at which the coordinates was determined. The location and time are logged onto database 132 at step 510 and server 112 checks the log to determine whether the logged value coordinates and times are the first or a subsequent set of values at step 512. If the logged values are a first set of values for the location and time, the timer is checked at step 504 to determine whether the predetermined interval has elapsed. If the interval has elapsed, a second set of coordinates for the location of the handset are determined at step 506 and transmitted to server 112. Server 112 may be programmed to query handset 100 at predetermined intervals to obtain coordinates and times. Alternatively, handset 100 may be programmed to transmit velocity and/or coordinates and times at pre-programmed intervals.

In steps 514 through 522 the relative average velocity of the handset during the predetermined interval are calculated as previously described. As used herein, 'relative average velocity" is calculated as the distance between coordinates at which handset 100 at first and second times located divided by the interval between the first and second times. The calculations are performed on server 112 using coordinates and times stored on database 132. At step 524 the relative average velocity of the handset is compared to a pre-programmed value stored on database 132. If the relative average velocity of the handset is in excess of the pre-programmed value, indicating that the user of the handset may be operating a vehicle, the server 112 transmits a pre-programmed alert message to a user device 114. Alternatively, if the relative average velocity of the handset is less than the pre-programmed value, the internet connection is closed at step 528 until the method is triggered again when the predetermined time elapses at step 504. In this variation, the calculations to determine the relative average velocity of the handset are performed on server 112 which is programmed to transmit the alert message if the calculated value exceeds the predetermined value.

In different embodiments, the average velocity calculation may be performed by the GPS module in handset 100 at predetermined intervals, for example at one, three, five second intervals. In these embodiments, it may not be necessary to perform the velocity calculation with server 112. In these embodiments, the preprogrammed alert message may be transmitted when server 112 receives a transmission from handset 100 indicating that handset is traveling at an average velocity greater than the preprogrammed value.

Figure 6:
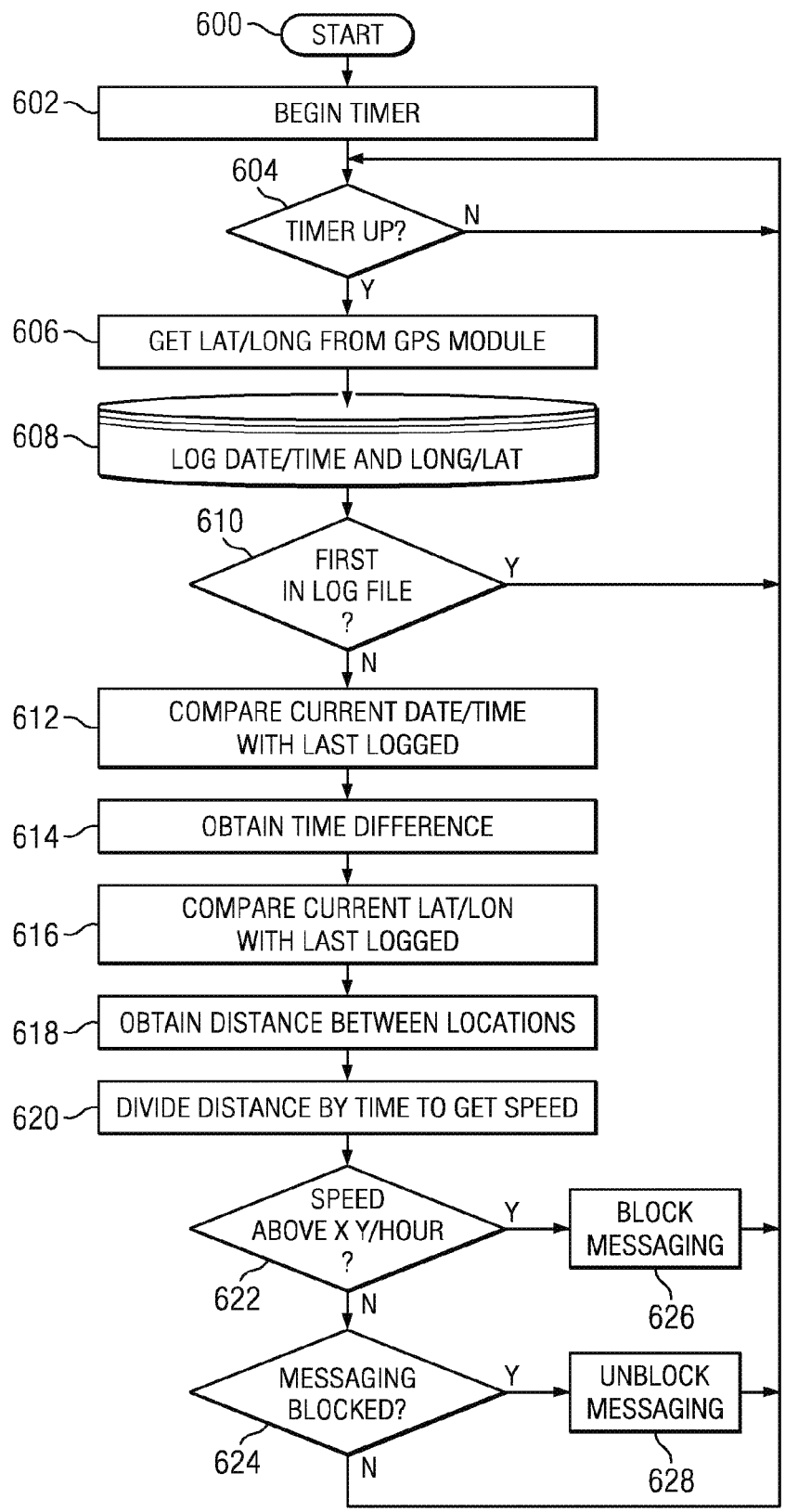
FIG. 6 is a flow chart illustrating a fifth method according to the disclosure.

Referring now to FIG. 6, in another embodiment, a method according to the disclosure is initiated at step 600 when the user of handset 100 turns the handset on. In this variation, the location of handset 100 is determined at periodic predetermined intervals to determine the relative average velocity of the handset. At step 602 a timer or timing function is initialized and started. The timer may be set for a predetermined interval such as 3, 5 or 10 minutes. Steps 604 through steps 620 are substantially the same or identical to steps 202 through 220 of FIG. 2. At step 622 the relative average velocity of handset 100 is compared to a predetermined velocity value that has been pre-programmed into handset 100. If the relative average velocity of handset 100 is greater than the predetermined value, one or more functionalities of the cell phone may be blocked at step 626. The blocked functionalities may include voice communication, text messaging (SMS), multi-media messaging (MMS), email, internet access, and/or video or image transmission.

If the relative average velocity of handset 100 is less than the predetermined value, at step 624 it is determined whether a messaging function has previously been blocked. If a messaging function is blocked, at step 628 the function is unblocked. In this variation, all of the functions and functionalities employed in the method are programmed into, or hardwired, into handset 100.

Figure 7:
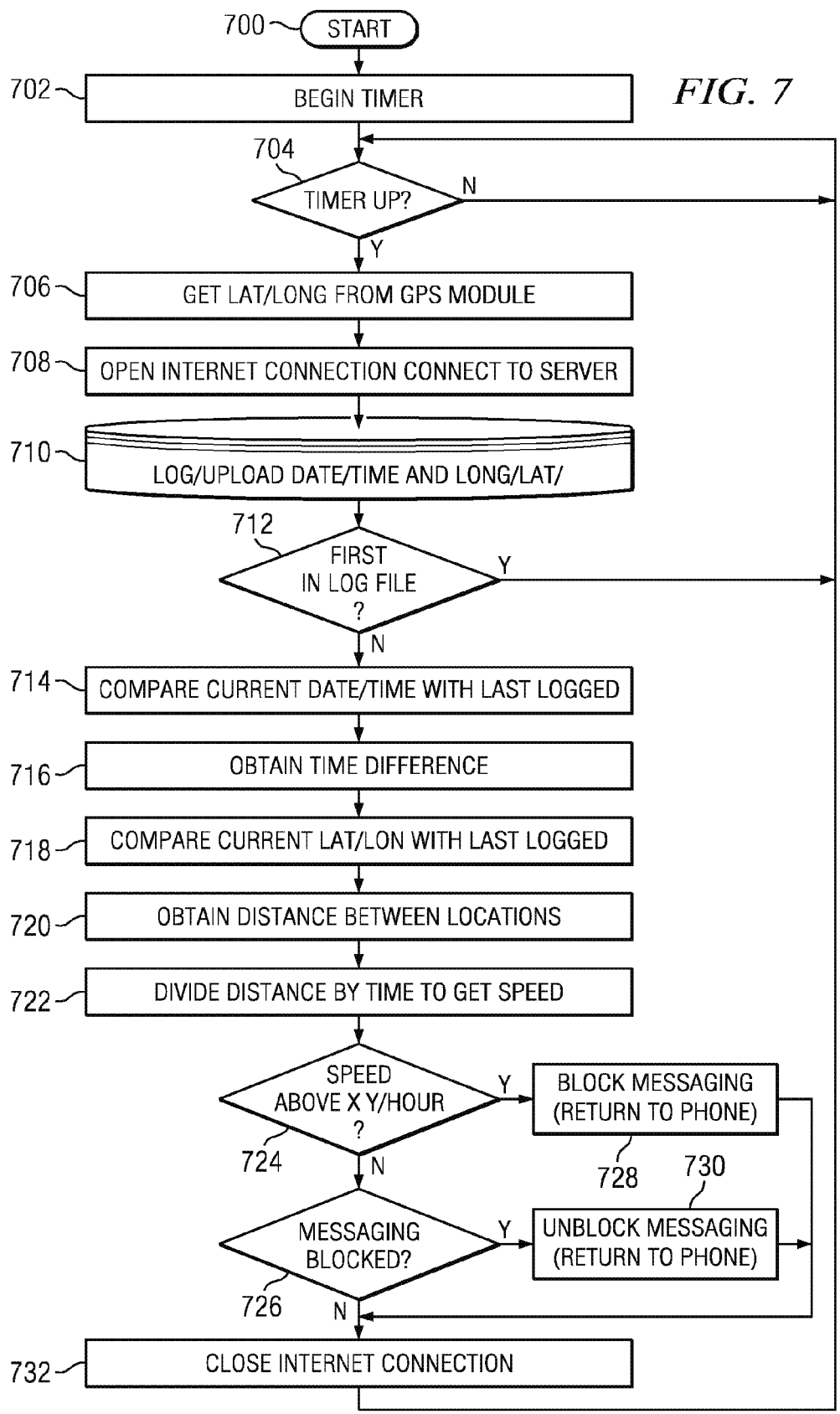
FIG. 7 is a flow chart illustrating a sixth method according to the disclosure.

FIG. 7 is a flow chart illustrating another method according to the disclosure. At step 700 the process is initiated when the user of handset 100 turns the handset on. At step 702 a timer is initialized and started. The timer may be set for a predetermined time interval such as 3, 5 or 10 minutes. After the timer or timing functions times out at step 704, at step 706 the position of handset 100 is determined using GPS module 106. Handset 100 opens an internet connection at step 708 and communicates with a remote computer such as server 112 (FIG. 1). Handset 100 transmits the position of handset and optionally the time at which the position of the handset was determined to server 112. The timer or timing function may be resident on handset 100 or on server 112. If the timer is resident on server 112, the server transmits a location inquiry to handset 100 at predetermined periodic intervals. When handset 100 receives the inquiry, it responds with its location as determined with GPS module 106 (FIG. 1).

Server 112 logs the coordinates of handset 100 in database 132 at step 710 and checks the log at step 712 to determine whether prior coordinates and a corresponding time have been stored. If not, a second set of coordinates and corresponding time are obtained when the predetermined time interval elapses at step 704. If prior coordinates and a corresponding time have been stored, at step 714, server 112 compares the most recently logged position of handset 100 with the previous entry. The server calculates the difference in time between the successive entries at step 716 and compares the positions of the handset at step 718. At step 720, server 112 calculates the distance between the logged locations of the handset and then at step 722 divides the calculated distance by the calculated time difference between the logged entries to determine a relative average velocity for the handset.

At step 724 the server compares the calculated average relative velocity with a predetermined velocity value such as 10 or 20 kilometers or miles per hour. If the calculated average relative velocity of the handset is greater than the predetermined value, indicating that the handset is in a moving vehicle, server 112 may transmit a message to handset 100 to block or disable one or more functions of the handset at step 728. The message may, for example, include an instruction to change a setting of the handset to inhibit an associated function. The disabled or blocked function may be text messaging (SMS), multi-media messaging (MMS), email, internet access or another non-voice function of the handset. In other variations, voice communications may also be blocked.

After server 112 has transmitted the message to handset 100 to block or disable one or more functions of the handset 100 at step 728, the internet connection between server 112 and handset 100 is closed at step 732. Alternatively, if the relative average velocity of handset 100 is less than the predetermined value, indicating that the handset is not in a moving vehicle, a check is made to determine whether one or more of the handset functions has been previously blocked at step 726. If one or more functions of the handset have been blocked, the function is unblocked at step 730 and the internet connection is closed at step 732.

In the embodiment illustrated in FIG. 7, handset 100 detects and transmits its coordinates at predetermined intervals. The calculation of the relative average velocity of the handset and the determination of whether to block or unblock any functions of the handset is done with server 112. Server 112 uses pre-programmed logic to determine the relative average velocity of the handset using two or more logged locations and times and makes the determination as to whether one or more functions of handset 100 may be blocked or unblocked. After making a determination to inhibit or enable a function of handset 100, the server transmits a message to the handset to implement a preprogrammed instruction to inhibit or enable the function.

Although as described, two consecutive locations of handset 100 are used to determine a relative average velocity of the handset, multiple logged locations and time entries may be used for the calculations. Thus, for example, 3, 4 or 5 logged location and time entries may be utilized to determine the relative average velocity of handset 100. In one embodiment, a nominated person such as a parent or guardian, may communicate with server 112 and/or handset 100 via a personal communications device 114 (FIG. 1) to override or change settings such as the predetermined velocity value, the intervals at which the position of the handset is determined and whether functions of the handset should or should not be inhibited or disabled. For example, if the user of the handset is traveling on a bus or a train, the nominated person may wish to prevent blocking or inhibiting functions of the handset. The nominated person may be required to use a password, PIN or other security measure to access and change setting of handset 100.

Figure 8:
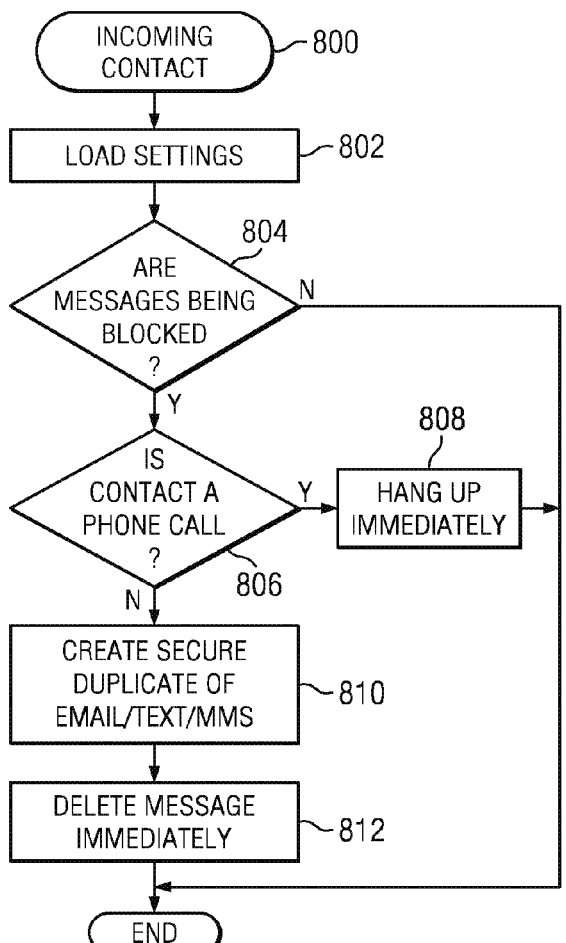
FIG. 8 is a flow chart illustrating a seventh method according to the disclosure.

FIG. 8 is a flowchart of a further embodiment of a method according to the disclosure wherein incoming voice and/or non-voice messages may be blocked and/or unblocked. The method is initiated at a step 800 when handset 100 detects an incoming call. At step 802 a settings file is checked to determine whether one or more functions of handset 100 have previously been blocked or disabled. If it is determined at step 804 that one or more functions of handset 100 have previously been disabled, for example SMS or MMS, then at step 806 the transmission received by handset 100 is identified as a voice call or a non-voice communication. If the transmission is a voice call, at step 808, handset 100 may terminate and disconnect the call. If the transmission is a non-voice communication such as SMS, MMS or email, the message is copied at step 810. The copied message may be transmitted to server 112 via the cellular network and/or internet. The non-voice communication is then deleted from handset 100 at step 812.

Figure 9:
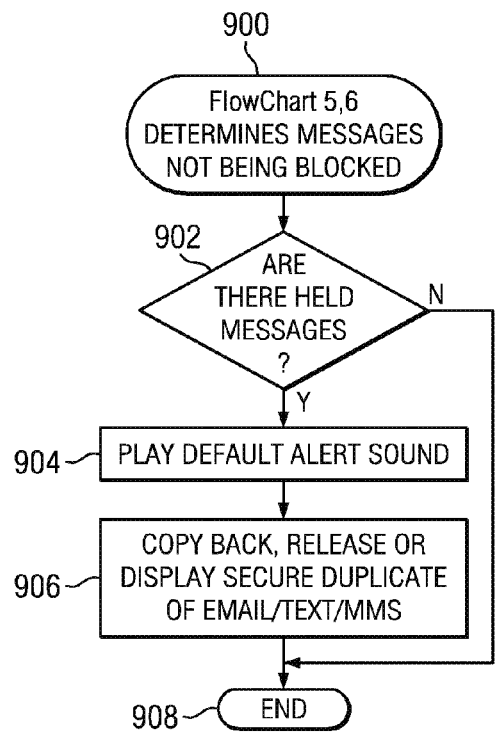
FIG. 9 is a flow chart illustrating an eighth method according to the disclosure.

FIG. 9 is a flow chart illustrating the retrieval of stored messages if it is determined that the one or more functions of handset 100 are no longer blocked. Referring again to FIG. 7, if a determination is made at step 730 to unblock one or more functions of handset 100, then at step 900 of FIG. 9 the process of retrieving stored messages is initiated. If it is determined that textual messages have been stored and held (step 902) then at step 904 handset 100 may emit or display an alert. In one variation, the alert may be an audible tone emitted by the handset. In other variations an alert message may be displayed on display 108 of handset 100. At step 906, the held messages may be transmitted and/or copied back to handset 100, released and/or displayed by the handset.

Figure 10:
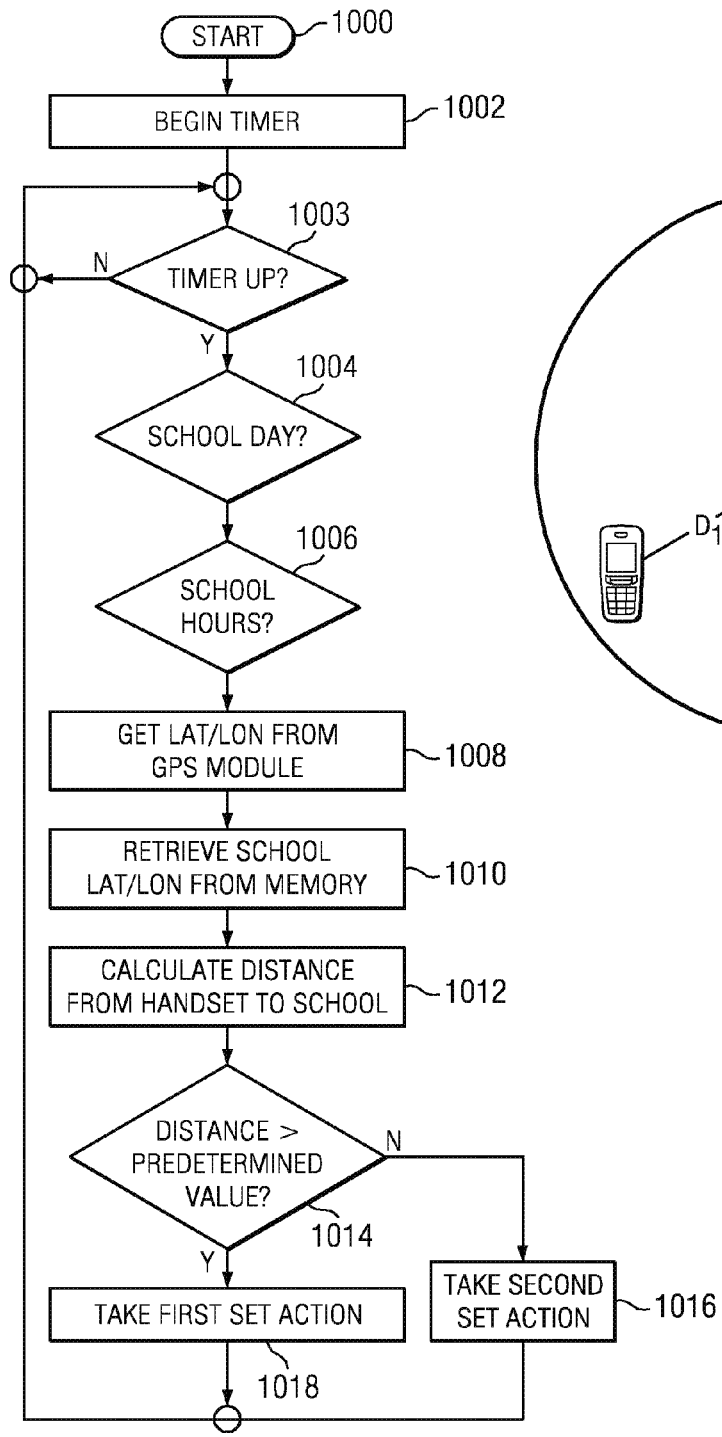
FIG. 10 is a flow chart illustrating a ninth method according to the disclosure.
Figure 11:
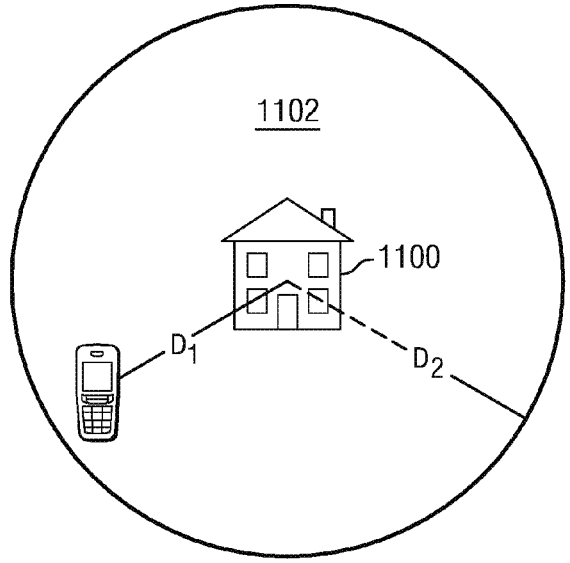
FIG. 11 is a schematic representation further illustrating the method of FIG. 10.

FIG. 10 is a flowchart illustrating another embodiment of a method according to the disclosure. FIG. 11 is a schematic representation further illustrating the method. At step 1000, the process is initiated when handset 100 is activated. At step 1002 a timer or timing function is initialized. The timer or timing function may be set a predetermined interval, for example 15 or 30 minutes. The timer or timing function is checked at step 1003. If the predetermined time has elapsed, at steps 1004 and 1006, the current date and time are checked to determine whether the current date is a school day and that the current time is within school hours, for example from 7:00 am to 3:00 pm. If the current date is a school day and the current time is within school hours, the location (latitude, longitude) of handset 100 is determined at step 1008 with GPS module 106 (FIG. 1). The location of the school 1100, (e.g. latitude, longitude) is retrieved from memory at step 1010 and the distance D1 (FIG. 11) between the handset and school is calculated at step 1012.

At step 1014, the calculated distance between school 1100 and handset 100 (D1) is compared to a predetermined value, D2 for example 0.1, 0.5 or 1.0 miles. Distance D2 may be selected based on the geographical expanse of school 1100. As illustrated in FIG. 11, D2 defines a geographic zone 1102 around the coordinates selected for school 1100. If the calculated distance D1 is less than the predetermined value D2, indicating that the handset is within geographic zone 1102, a first set action 1016 may be taken. The first set action 1016 may be disabling one or more functions of handset 100, for example blocking the user from initiating calls and/or blocking non-voice messaging functions such as an SMS or MMS. In one variation, handset 100 may receive calls but be blocked from initiating calls. In other embodiments, the set action may be locking the data entry feature 108 (FIG. 1) of handset 100, disabling the display 102 or turning the handset off for a predetermined period of time. Alternatively, if the distance between handset 100 and school 1100 is greater than predetermined value D2, indicating for example, that the user of the handset is not at school, a second set action 1018 may be taken.

The second set action may include transmitting an alert in the form of a textual message, voice message, email or telephone call to a nominated person such as a parent or guardian, indicating that the handset (and the user of the handset) is not at, or within a specified distance of the school. The second set action may include transmitting the coordinates of handset 100 to the nominated person. After the first or second set actions, the timer or timing function is re-initialized and the process repeated. In this variation, all of the functions and functionalities employed in the method may be programmed into, or hardwired, into handset 100.

While the method of FIG. 10 has been presented in the context of a school or school zone, the same or a similar method may be employed in other situations. For example, if a child or teenager is supposed to be at a given location for a specified period of time, a nominated person may wish to monitor the position of a handset in the possession of the child or teenager. For example, if a child is at a friend's house or at a movie, a parent or guardian may wish to have the position of a cellular telephone in the child's possession monitored at predetermined intervals.

Figure 12:
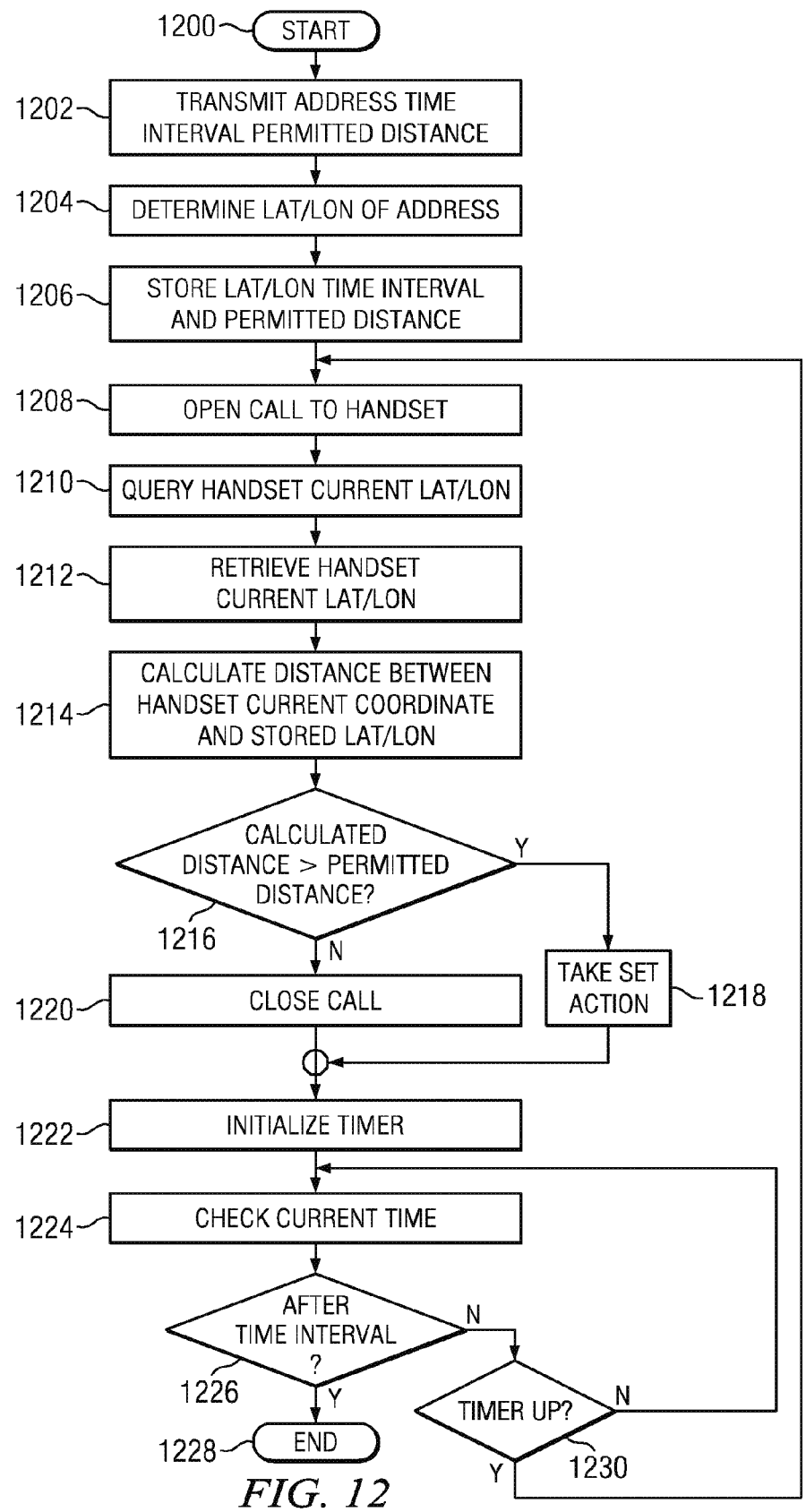
FIG. 12 is a flow chart illustrating a tenth method according to the disclosure.

Referring now to FIG. 12, in one method according to the disclosure, the process is initiated at step 1200 when the nominated person opens an internet connection with a user device such as personal computer 114 (FIG. 1). The nominated person opens a connection to server 112 and transmits the location, typically an address, to server 112 at step 1202. The nominated person may also transmit the time interval the child is to be at the location and a specified permitted distance from the location to server 112 via the internet using a user device 114. The specified permitted distance is a distance from the location that the handset may be located without triggering a set action such as an alert.

At step 1204 server 112 receives the address and may determine the latitude and longitude of the address using a mapping function and/or database. Server 112 stores the latitude and longitude of the address, the specified times and the specified permitted distance at step 1206. At step 1208, server 112 opens a call to handset 100 and queries the handset for its current position (latitude, longitude) at step 1210. The position of handset 100 is determined using GPS module 106 and transmitted to server 112. At step 1212, server 112 receives the current coordinates of handset 100 and calculates the distance between the handset and the location specified by the nominated person at step 1214.

At step 1216, server 112 compares the distance between handset 100 and the specified distance to the specified permitted distance. If the distance between handset 100 and the stored coordinates is greater than the specified permitted distance, one or more set action(s) are taken at step 1218. The set actions may include transmitting an alert to the nominated person, alerting them that the handset is not at, or within the predetermined distance from, the specified location during the specified time interval. The set actions may also include transmitting the current coordinates of handset 100 to the nominated person, opening a call from handset 100 to the nominated person and/or inhibiting or disabling one or more functions of the handset, for example disabling non-voice communications such as text messaging. If the distance between the current coordinates of handset 100 and the stored coordinates is less than the specified permitted distance, the connection between server 112 and handset 100 is terminated at step 1220 and a timer or timing function is initialized or re-initialized at step 1222. The timer or timing function is set to a predetermined interval, for example 10 or 15 minutes, after which server 112 will open another call to handset 100.

At step 1224, server 112 checks the current time and compares it to the specified time interval at step 1226. If the current time is after the specified time interval, the program is terminated at step 1228. If not, the timer is checked at step 1230 and if the timer has elapsed, the server opens another call to handset 100 at step 1208 and the process is repeated. If the timer has not elapsed, the program loops back to check the current time.

Figure 13:
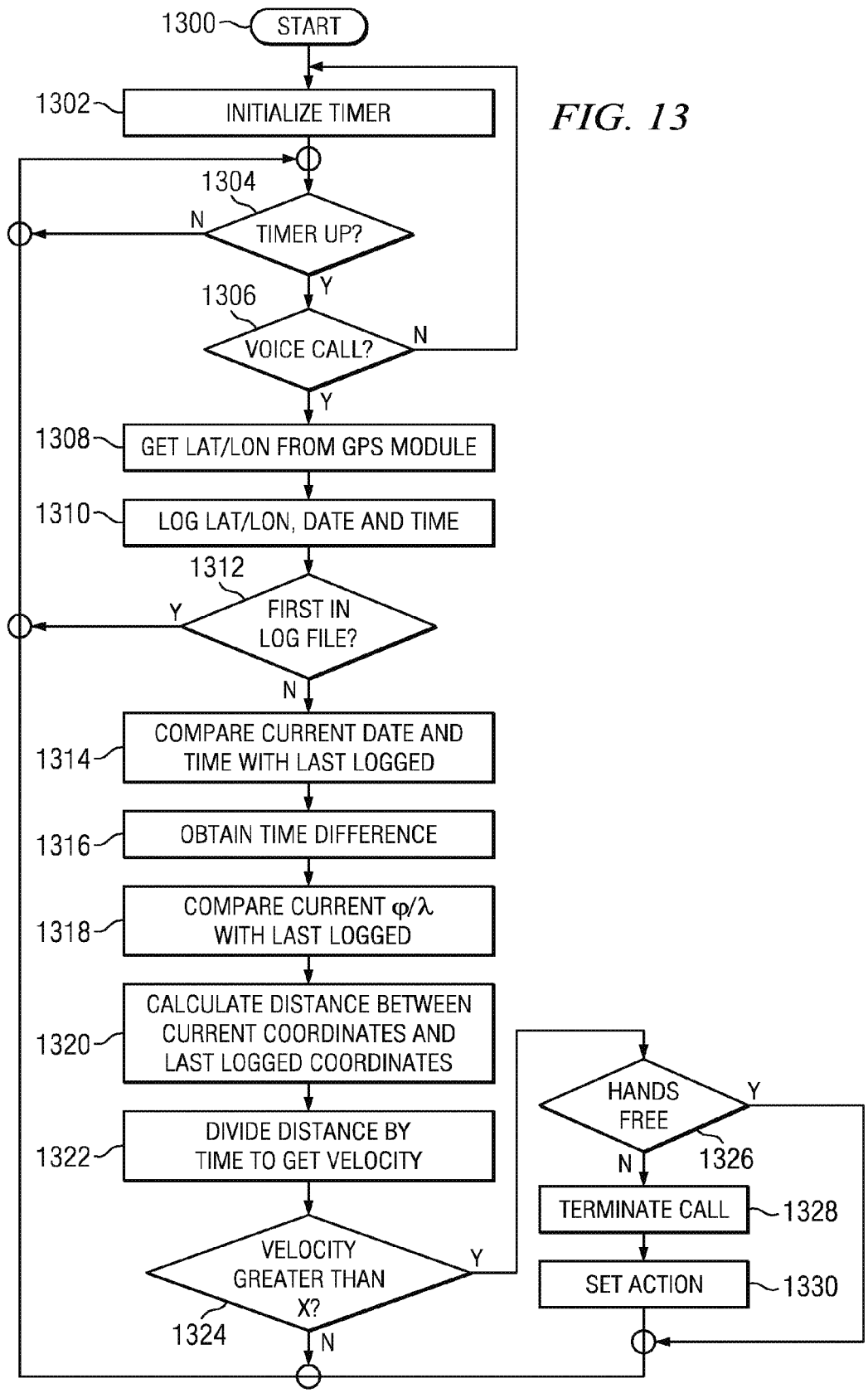
FIG. 13 is a flow chart illustrating an eleventh method according to the disclosure.

In yet another variation, a method according to the disclosure may block or disable voice calling functions of a portable personal communications device such as handset 100 if the device is moving at a rate indicating that the handset is in a vehicle and if the device is not in a hands free mode. Referring now to FIG. 13, process is initiated at step 1300 when handset 100 is activated. At step 1302 a timer or timing function is initialized and started. The timer or timing function may be set for a predetermined time interval such as 15, 30 seconds or longer.

At step 1304 the timer is checked and if the predetermined time has elapsed, a check is made to determine whether the handset is set to receive a voice call at step 1306. If handset 100 (FIG. 1) is set to receive voice calls, at step 1306, the position (latitude, longitude) of handset 100 is obtained using GPS module 106 at step 1308. The date and time along with the coordinates of the handset are logged or stored in memory 118 of handset 100 at step 1310. At step 1312 a check is made to determine whether a previous position and time have been logged.

If a prior position and time have not been logged, the process returns to step 1304 to determine whether the predetermined time interval has elapsed. If so, a second location of handset 100 is determined at step 1308 and the second location and time are stored in memory 118 of handset 100. After two successive locations and times have been stored, the successive stored times are compared at step 1314 and a time difference between the two stored locations and times is calculated at step 1316. At step 1318 the first and second stored coordinates of handset 100 corresponding to the first and second stored times are compared and the distance between the first and second coordinates is determined at step 1320. The distance between the successive coordinates is divided by the difference in the times at which the handset was located at the two locations to determine a relative average velocity for the handset at step 1322.

At step 1322, the relative average velocity of the handset is compared to a predetermined velocity value X, for example 10 or 20 miles per hour, to determine whether the handset may be in a moving vehicle. If the relative average velocity of handset 100 exceeds or has exceeded X, the predetermined velocity value, a check is made to determine if handset 100 is in a hands free mode at step 1326. If the handset is not in a hands free mode, any voice call is terminated at step 1328 and a predetermined set action may be taken at step 1330. The predetermined set action may include blocking one or more of the functions of handset 100. The blocked functions may remain disabled for a predetermined period of time, or example 5, 10 or 20 minutes or may remain blocked until the nominated person re-enables the functions. The predetermined set action may also include transmitting a textual message, email or telephone call to a nominated person such as a parent or guardian. In one variation, the nominated person may respond with a message disabling or blocking one or more functions of the handset.

Figure 14:
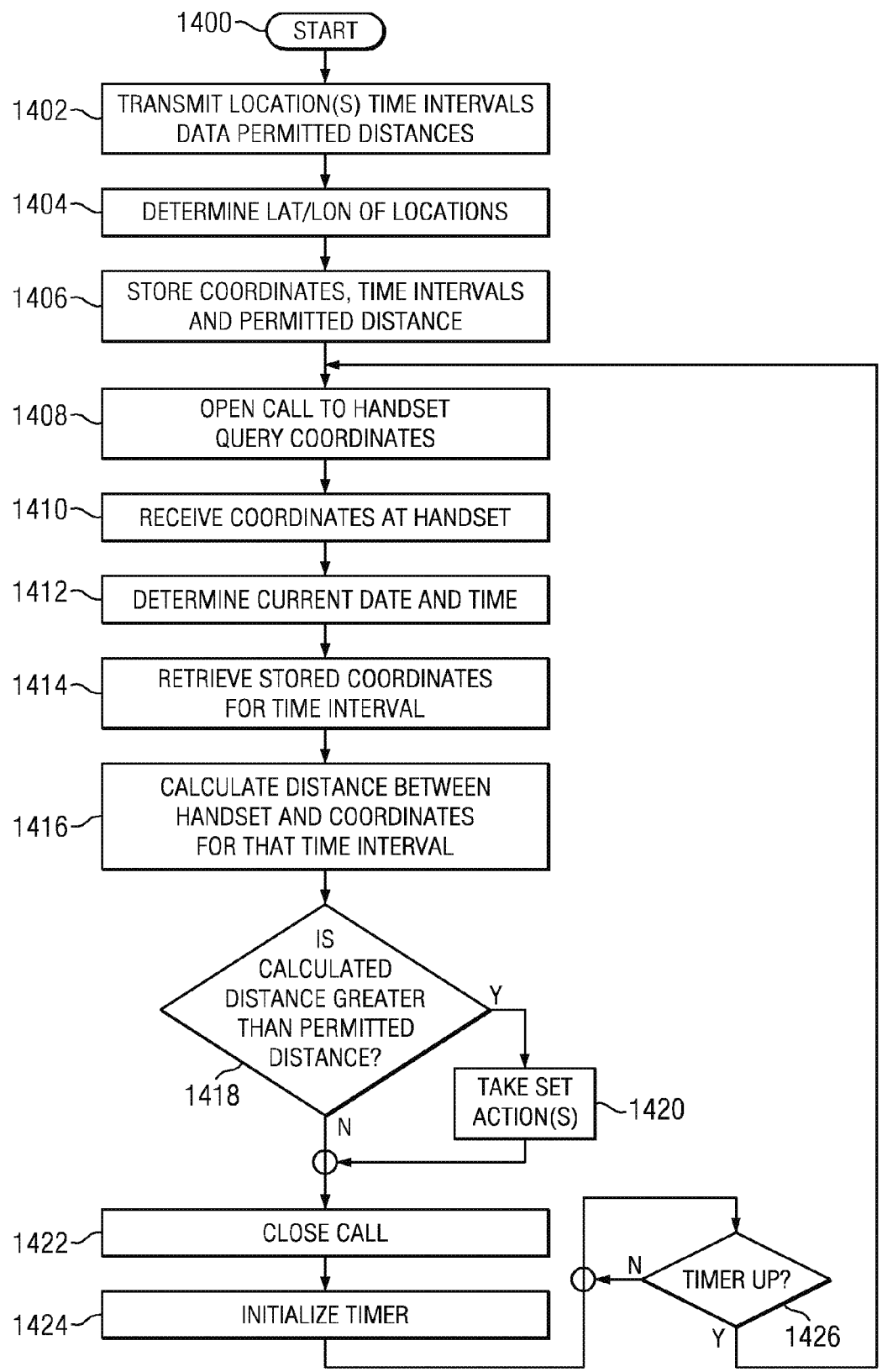
FIG. 14 is a flow chart illustrating a twelfth method according to the disclosure.

Turning now to FIG. 14, yet another method according to the invention is disclosed. The method is initiated at step 1400 when a nominated person opens a connection to server 112. At step 1402, the nominated person transmits a series of time intervals and corresponding locations, e.g. addresses or coordinates, to server 112 indicating where the individual in possession of handset 100 should be located during the corresponding time intervals. The nominated person may also enter dates and a specified permitted distance from each of the locations. Alternatively, sever 112 may use a preprogrammed default value, for example 200 meters. In the case of a child, the first entry may be the address of the child's school, a time interval corresponding to school hours, e.g. from 7:00 am to 3:00 pm and a permitted distance of 300 meters. A second entry may be the location where the child is to be for a period after school hours, for example the library, a friend's house or other location, a corresponding time interval, for example from 4:00 pm to 6:00 pm and a permitted distance, for example 100 meters. A third entry may be the child's home address, another corresponding time interval, for example from 6:30 pm to 6:30 am and a permitted distance of 50 meters.

If the nominated person entered addresses rather than coordinates, at step 1404, server 112, determines the coordinates of each of the specified locations. The specified dates, coordinates, time intervals and permitted distances are stored in database 132 at step 1406. At step 1408, server 112 opens a call to handset 100 and queries the handset for its coordinates. The coordinates of handset 100 are determined with GPS module 106 and transmitted to server 112. At step 1410, server 112 receives the current coordinates of handset 100 and checks the current time at step 1412. Server 112 retrieves the coordinates of the location specified by the nominating person for that time at step 1414. At step 1416 the current coordinates of handset 100 are compared to the specified coordinates and the distance between the two sets of coordinates is determined.

At step 1418 the calculated distance is compared to the permitted distance for specified time interval and coordinates. If the calculated distance is greater than the specified permitted distance, a set action may be taken at step 1420. The set actions may include inhibiting or enabling a function of handset 100. Set actions may include transmitting an alert to the nominated person, alerting them that the handset is not at, or within the predetermined distance from, the specified location during the specified time interval. The set actions may also include transmitting the current coordinates of handset 100 to the nominated person, opening a call from handset 100 to the nominated person and/or inhibiting or disabling one or more functions of the handset, for example disabling non-voice communications such as text messaging. In one variation, if the calculated distance is less than the permitted distance, other set actions may be taken. For example, during school hours when handset is located at the child's school, one or more functions of the handset, such as text or multimedia messaging may be disabled. If the current time is after school hours and/or if the calculated distance is greater than the permitted distance, the inhibited function may be enabled if previously blocked or disabled.

If the calculated distance is less than the permitted distance or after any set actions have been taken, the call from server 112 to handset 100 is closed at step 1422 and a timer or timing function initialized or re-initialized at step 1424. The timer or timing function may be set to a predetermined time period, for example 5, 10 or 15 minutes or longer. After the predetermined time has lapsed at step 1426, server 112 initiates another call to handset 100 at step 1408 and the process is repeated.

Referring again to FIG. 1, as will be appreciated, methods according to the disclosure may be implemented using hardware and/or software resident on a multi-function portable communications device such as cellular handset 100. Alternatively, methods according to the disclosure may be implemented with a combination of hardware and software on handset 100 and hardware and software on a remote computer such as server 112. In yet other embodiments, methods according to the disclosure may be implemented with a combination of hardware and software on handset 100 along with hardware and software resident on a user device 114 such as a personal computer.

It will be appreciated by those skilled in the art having the benefit of this disclosure that this disclosure provides a method of inhibiting functions of a mobile communications device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of inhibiting a function of a multi-function portable personal communications device and transmitting an alert, the method comprising:
   determining a first position of the portable personal communications device;
   determining an average velocity of the portable personal communications device;
   determining when the first position of the portable personal communication device is within a predetermined distance of a target location;
   obtaining a predetermined velocity threshold;
   obtaining a restriction time period;
   inhibiting a function of the portable personal communications device when the average velocity exceeds the predetermined velocity threshold during the restriction time period; and
   transmitting an alert, from the portable personal communications device, as one or more of the following:
   a textual message,
   a voice message,
   an email,
   a telephone call, and
   a message to a server,
   when the first position is outside the predetermined distance of the target location during the restriction time period, wherein the alert is configured to indicate to a parent or a guardian that the portable personal communications device is not at or within the predetermined distance of the target location.

2. The method of claim 1 wherein the step of determining the average velocity comprises the steps of:
   determining a first position of the portable personal communications device;
   after a predetermined time interval, determining a second position of the portable personal communications device;
   determining the distance between the first position and the second position;
   determining the time interval in which the portable personal communications device moved from the first position and the second position;
   calculating an average velocity of the portable personal communications device based on the first position, the second position and the time interval.

3. The method of claim 2 wherein the portable personal communications device comprises a cellular telephone handset including a global position receiver for determining the first and second position of the cellular handset and wherein the inhibited function is one or more textual message services.

4. The method of claim 3 wherein the textual message service include one or more of a Short Message Service (SMS), Multimedia Messaging Service (MIMS), Mobile Instant Messaging Service (MIMS), email and Internet access.

5. The method of claim 3 wherein the step of inhibiting includes blocking calls made to the cellular telephone handset.

6. The method of claim 3 wherein the step of inhibiting includes blocking calls made from the cellular telephone handset.

7. The method of claim 2 wherein the multi-function portable personal communications device includes a global positioning receiver and wherein the step of determining the first and second positions of the device comprises receiving signals from a plurality of global positioning system satellites.

8. The method of claim 2 wherein the step of determining an average velocity comprises determining the distance between the first and second positions and dividing the distance by the time interval in which the portable personal communications device moved from the first position to the second position.

9. The method of claim 1 wherein the alert comprises the average velocity of the portable personal communications device.

10. The method of claim 1, further comprising receiving an input of the target location and the restriction time period.

11. The method of claim 1, further comprising receiving an input for determining which function of the portable personal communications device to inhibit.

12. The method of claim 1, wherein the alert comprises the first location of the portable personal communications device.

13. A system for inhibiting a function of a multi-function portable personal communications device and transmitting an alert, the system comprising:
   a location identifier module configured to determine a first position of the portable personal communications device;
   a processing unit configured to:
       compare the first position of the portable personal communications device with a target location during a restriction time period;
       determine an average velocity of the portable personal communications device;
       inhibit a first function of the portable personal communication device based at least partly on the average velocity of the portable personal communications device; and
       process an alert based on the said comparison of the first position of the portable personal communications device with the target location during the restriction time period; and
   a radio interface configured to transmit the alert in a textual message, or a voice message, or an email, or a telephone call, or a message to a server, wherein the alert is configured to indicate to a parent or a guardian that the portable personal communications device is not at or within a predetermined distance of the target location during the restriction time period.

14. The system of claim 13, further comprising an administrative module configured to receive an input of the target location and the restriction time period.

15. The system of claim 14, wherein the administrative module is located on the portable personal communications device.

16. The system of claim 14, wherein the administrative module is located on a server.

17. The system of claim 13, wherein the administrative module is further configured to receive an input for determining which function of the portable personal communications device to inhibit.

18. The system of claim 13, wherein the location identifier module comprises a global positioning system module.

19. The system of claim 13, wherein the alert comprises the first location of the portable personal communications device.

20. The system of claim 13, wherein the processing unit is further configured to inhibit a second function of the portable personal communications device during the restriction time period.

* * * * *